H. M. DARRAH.
VEHICLE TIRE.
APPLICATION FILED MAY 24, 1915.
1,160,144.
Patented Nov. 16, 1915.
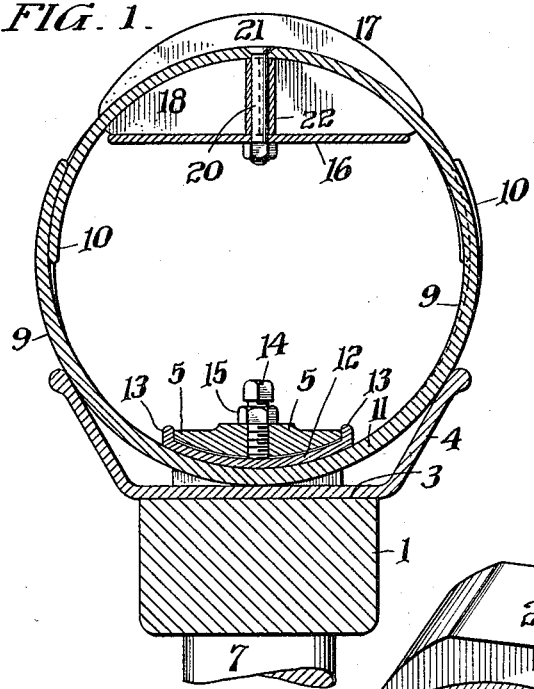
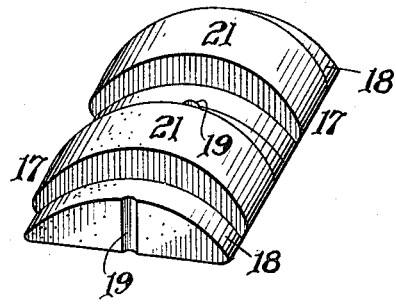
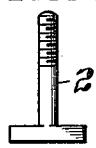
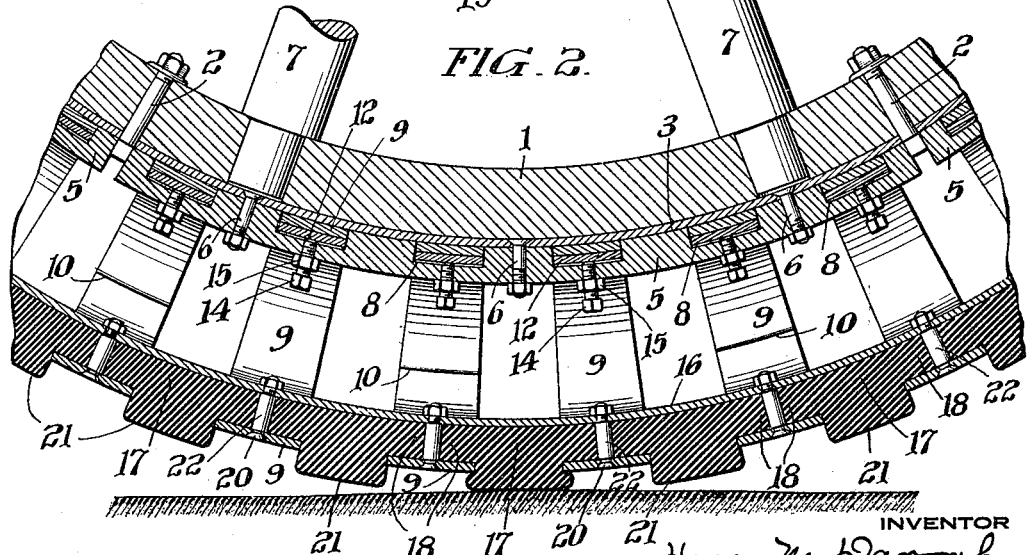

UNITED STATES PATENT OFFICE.

HARRY M. DARRAH, OF PHILADELPHIA, PENNSYLVANIA.

VEHICLE-TIRE.

1,160,144.  Specification of Letters Patent.  Patented Nov. 16, 1915.

Application filed May 24, 1915. Serial No. 29,959.

*To all whom it may concern:*

Be it known that I, HARRY M. DARRAH, a citizen of the United States, and resident of Philadelphia, county of Philadelphia, and State of Pennsylvania, have invented an Improvement in Vehicle-Tires, of which the following is a specification.

The object of the invention is to provide a tire for motor vehicles, motorcycles or the like, having the required resilient and shock absorbing qualities necessary to reduce the jar upon the vehicle frame or its parts caused by irregularities in the road and the general conditions to which tires of this character are subjected.

A further object is to provide a tire which is more durable and effective for all uses and purposes, and not subject to punctures, whereby the mileage of the tire in use may be materially increased.

A further object is to provide a tire consisting of a plurality of separate, independent spring buffers or shock absorbing resilient units, so arranged and constructed as to coöperate with a tread member of cushioning material to either substantially eliminate the shocks to the wheel, or materially reduce them.

A further object is to provide a tire comprising a plurality of interchangeable, independent shock absorbing units, any of which may be replaced or repaired without altering the adjustment of any of the others so that while the device when assembled forms a complete unitary structure, it is in effect made up of separable accessible units.

With the above and other objects in view, the nature of which will be more fully understood from the description hereinafter, the invention consists in the novel construction of vehicle tire as hereinafter more fully described and defined in the claims.

Referring to the drawings: Figure 1 represents a transverse section of a tire and wheel construction embodying my invention; Fig. 2 represents a longitudinal section of a portion of the same; Fig. 3 represents a perspective view of a portion of the tread; Fig. 4 represents one of the fastening bolts for the rim; and Fig. 5 is a modified form of tread.

1 designates the felly of a vehicle wheel which is suitably apertured at intervals for the purpose of receiving fastening bolts 2 which serve to clamp or retain the annular rim 3 in position upon the outer periphery of the felly 1. This rim 3 is preferably of metal and having its body part seated upon the felly and provided with outwardly diverging side flanges 4 at opposite sides which extend circumferentially about the rim to form a suitable groove or seat for the removable parts of the tire proper. In connection with the bolts 2 it will be noted that in the preferred form they are substantially T-shaped, as illustrated in Fig. 4, and in operative position the head extends transversely across the face of the rim in order to take up as small a space as possible, for a purpose which will later appear.

5 designates a plurality of auxiliary rim sections circumferentially arranged about the periphery of the rim 3 and having their respective end portions preferably abutting the heads of the bolts 2 so that the spacing between the shock absorbing elements of the tire structure is uniform. In view of the fact that these auxiliary sections 5 are all of similar construction and similarly mounted, the description will be limited to but one, as the same reference numerals apply to all.

6 designates suitable bolts substantially radially disposed through the rim 3 and section 5, whereby the two parts are fixedly secured together in a manner to prevent either lateral relative movement or circumferential creeping of the parts.

8 designates a plurality of slots transversely disposed through the section 5 and opening against the rim 3 for the purpose of respectively receiving spring buffers or shock absorbers 9. Each of these buffers 9 consists of a band of spring metal of split construction having the meeting ends overlapped as indicated at 10 to provide an effective flexing action. The spring buffer has a portion passing through the slot 8 whereby it is held in a position substantially radially disposed of the wheel. Each of these spring buffers, furthermore, preferably has a cross sectional area gradually reduced from a point adjacent the rim 3 to the tread part, and in the example shown the tread portion of each spring buffer is substantially one-eighth of an inch in thickness, while the base portion 11 is substantially three-sixteenths of an inch thick. It will be understood, however, that I do not wish to be limited to these exact dimensions as these details may be variously modified. The base portion of each spring buffer is fixedly secured in its slot 8 against the rim 3 by a retaining plate or saddle 12 which is of curved contour to conform to the inner curvature of the buffer and also has side flanges 13 which straddle the section 5 to form an auxiliary means to prevent lateral displacement of these parts. The said retaining plate or saddle 12 is locked or clamped against the buffer by means of a set screw 14 which is provided with a suitable lock nut 15 to maintain the adjustment fixed. The respective spring buffers preferably diverge from the inner rim to preserve a substantially radial arrangement and also to provide a somewhat larger bearing for the tread portion. It will also be noted that the spring buffers are alternately arranged with respect to the overlapping ends 10, so that one buffer has these ends at one side of the tire while the next adjacent buffer has its end portions 10 at the opposite side of the tire, and so on all the way around the tire, whereby the general effect of all of the buffers is to produce a uniform, even yielding tendency. Furthermore, the overlapping end portions 10 of each buffer are so arranged that the end extending from the tread portion lies upon the inner circumference of the other end and is adapted to slide thereon under compressive action. This construction prevents the overlapping ends from opening up or spreading outwardly, as would be the case where the tread end overlapped upon the outside of the abutting end.

16 designates an outer flexible rim, preferably of metal, which forms a seat for a plurality of rubber tread sections 17, and each of which has circumferential portions 18 extending under adjacent buffers and seating against the inner circumferential surface thereof at one side and at the opposite side seating upon the flexible rim 16. The meeting ends of the abutting tread sections are radially recessed as shown at 19 to receive a fastening bolt 20 which forms a clamp between the flexible rim 16 and the buffer 9 at its outer or tread portion to retain the tread portions in proper position and prevent them bending backward in use. Each tread section is, furthermore, provided with a tread part 21 projecting outwardly beyond the adjacent spring buffers 9 to form the tread proper of the tire. These tread parts 21 may be spaced apart the width of a buffer, as in Fig. 2, or they may extend circumferentially over the buffers by being made as in Fig. 5, the general tread contour providing an effective traction for the purpose intended. By reference to Fig. 1 it will be seen that the buffers 9, while being retained in a fixed manner in a plane radially of the wheel, also abut the side flanges 4 of the rim 3, and are thereby prevented from lateral displacement.

In connection with the bolts 20 it will be noted that sleeves 22 are provided through which the respective bolts are adapted to pass, and the function of the sleeves is to form spacing elements of the same length between the rim 16 and the respective buffers 9 in order to transmit flexing movement from one part to the other. The provision of these spacing elements eliminates the strain and wear upon the bolt-heads, which would otherwise be present should the buffers move radially independent of the said flexible rim. By the union shown the outer or tread portions of the spring buffers and the flexible rim 16 move as a unit under the weight of the vehicle and prevent all circumferential bending of the spring buffers. The spacing tubular sleeves prevent undue clamping of the rubber tread elements and all looseness between the parts which would otherwise cause considerable wear.

From the foregoing it will be apparent that I have provided a construction which is highly resilient, flexible, and relatively light in weight, but having the required strength for the purpose intended. Obstructions or irregularities in the road are first taken up by the cushion tread, which may be of rubber or like material, and transmitted therefrom directly to the split spring buffers 9 where the shock is distributed and substantially absorbed before reaching the rigid part of the wheel construction. In view of the fact that the buffers are alternately arranged as to the position of the overlapping ends, it will be evident that both sides of the tire have substantially the same stiffness, as well as flexibility, and the entire wheel therefore maintains its balance. Furthermore, since each of the buffers is of tapered construction from the base toward the tread, the latter being of considerably less thickness than the base portion, each section has a tendency to more readily flex when in contact with uneven portions of the roadway with the result that the shock is more nearly absorbed.

Another feature which is advantageous resides in spacing the buffers a suitable distance apart and locating the tread portions of the respective tread sections radially opposite this space between the buffers. By this arrangement the parts bridging the buffers are given a chance to flex in use so that a portion of the shock is absorbed in this manner while the remaining portion is distributed to the adjacent buffers and absorbed by their spring action. The spacing between the buffers, furthermore, provides a means by which access may be readily had to the fastening bolts 6 and nuts 15 so that adjustments may be made if desired, and also permit any one of the buffers to be readily removed, replaced, or the like. The general shape or contour of the complete tire is that approximating the ordinary pneumatic tire, and in use suggests little departure from the general appearance of tires now in present day use.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what I claim as new and desire to protect by Letters Patent is:

1. In a device of the character stated, an inner rim secured to the felly of a wheel and provided with flanges, a plurality of circumferential sections secured to said rim and provided respectively with slots suitably spaced apart, an outer flexible rim encircling said sections and radially spaced therefrom, a plurality of spring buffers passing respectively through said slots and transversely over and connected to said outer rim, said buffers seating against said flanges and inner rim, means for independently holding the respective buffers in fixed operative position upon the inner rim, and a tread of cushioning material secured to said outer rim and extending between adjacent buffer springs.

2. In a device of the character stated, an inner rim secured to the felly of a wheel and provided with flanges, a plurality of circumferential sections secured to said rim and provided respectively with slots suitably spaced apart, an outer flexible rim encircling said sections and radially spaced therefrom, a plurality of transversely arranged spring buffers passing respectively through said slots and secured to said outer flexible rim, each spring buffer comprising a split band having overlapping end portions and said buffers being arranged with the split portions alternately at opposite sides of the tire, means on the circumferential sections for independently clamping each spring buffer in position, and an elastic tread removably secured to said outer rim.

3. In a device of the character stated, an inner rim secured to the felly of a wheel and provided with outwardly diverging flanges, a plurality of circumferential sections secured to said rim and provided respectively with slots suitably spaced apart, an outer rim encircling said sections and radially spaced therefrom, a plurality of transversely arranged spring buffers passing respectively through said slots and extending over and secured to said outer rim, each buffer comprising a split band having a cross sectional area gradually diminishing from the rim engaging portion to the tread portion and having its ends overlapping for sliding movement one within the other, means for independently clamping each spring buffer in position, and a rubber tread removably secured to said outer rim and extending beyond the spring buffers.

4. In a device of the character stated, an inner rim secured to the felly of a wheel and provided with flanges, a plurality of circumferential sections secured to said rim and provided respectively with slots suitably spaced apart, an outer rim encircling said sections and radially spaced therefrom, a plurality of transversely arranged spring buffers passing respectively through said slots and secured to said outer rim, each buffer comprising a split band having a cross sectional area gradually diminishing from the rim engaging portion to the tread portion and having its ends overlapping for sliding movement one within the other, means for independently clamping each spring buffer in position, a flexible tread removably secured to said outer rim and spring buffers, saddle members located respectively in said slots, said saddle members bearing at one side against the respective buffers and at the opposite side straddling the clamping section, and independent means for locking each saddle member in clamping relation with its buffer.

5. In a device of the character stated, an inner rim secured to the felly of a wheel, circumferentially arranged clamping sections secured to said rim and providing slotted portions suitably spaced apart, an outer rim encircling said sections and radially spaced therefrom, a plurality of transversely arranged spring buffers respectively extending through said slots, independent means for clamping each spring buffer in operative position, a tread member of cushioning material positioned upon the outer periphery of said outer rim, and means for clamping the tread between the outer rim and the respective tread portions of the spring buffers.

6. In a device of the character stated, an inner rim secured to the felly of a wheel, circumferential sections secured to said rim and providing slots suitably spaced apart, an outer rim encircling said sections and radially spaced therefrom, a plurality of transversely arranged spring buffers extending respectively through said slots and over the outer rim, independent means for clamping each buffer in operative position, a tread of cushioning material formed in sections each section comprising a tread part projecting outwardly between adjacent buffers and having a body part located between said outer rim and the tread portion of said buffers, and means for clamping said tread sections between said outer rim and the tread portion of said buffers.

7. In a device of the character stated, an inner rigid rim, an outer flexible rim, a plurality of transversely arranged spring buffers secured to the inner rim and inclosing the outer rim, said spring buffers comprising split steel bands, bolts connecting the tread portions of the respective spring buffers with the flexible rim, and yielding tread sections clamped in position upon the outer flexible rim and between it and the buffers and having radial portions projecting between adjacent buffers.

8. In a device of the character stated, an inner rigid rim, an outer flexible rim, a plurality of transversely arranged spring buffers secured to the inner rim and inclosing the outer rim, said spring buffers comprising split steel bands, bolts connecting the tread portions of the respective spring buffers with the flexible rim, yielding tread sections clamped in position upon the outer flexible rim and between it and the buffers and having radial portions projecting between adjacent buffers, and means for holding the spring buffers in widely spaced positions and detachably clamping them to the inner rim.

9. In a device of the character stated, an inner rigid rim an outer flexible rim, a plurality of transversely arranged spring buffers secured to the inner rim and inclosing the outer rim, said spring buffers comprising split steel bands, bolts connecting the tread portions of the respective spring buffers with the flexible rim, yielding tread sections clamped in position upon the outer flexible rim and between it and the buffers and having radial portions projecting between adjacent buffers said radial portions also having outer circumferential portions extending over the adjacent buffers to extend the yielding tread sections over the tread portions of the buffers as well as under them, and means for holding the spring buffers in widely spaced positions and detachably clamping them to the inner rim.

In testimony of which invention, I hereunto set my hand.

HARRY M. DARRAH.

Witnesses:
R. M. HUNTER,
E. W. SMITH.